United States Patent [19]

Sato et al.

[11] Patent Number: 5,212,674
[45] Date of Patent: May 18, 1993

[54] OPTICAL HIGH DENSITY DATA REPRODUCING APPARATUS USING INTERFERENCE TECHNIQUES

[75] Inventors: Chiaki Sato; Eishi Ikuta, both of Hachioji, Japan

[73] Assignee: Olympus Optical Co., Ltd., Tokyo, Japan

[21] Appl. No.: 711,213

[22] Filed: Jun. 6, 1991

[30] Foreign Application Priority Data

Jun. 15, 1990 [JP] Japan .................................. 2-155526
Aug. 2, 1990 [JP] Japan .................................. 2-203842
Apr. 19, 1991 [JP] Japan .................................. 3-88788

[51] Int. Cl.$^5$ .............................................. G11B 7/00
[52] U.S. Cl. ................................ 369/44.26; 369/44.41
[58] Field of Search ............... 369/44.11, 44.42, 44.26, 369/109, 124

[56] References Cited

U.S. PATENT DOCUMENTS

| | | | |
|---|---|---|---|
| 5,033,040 | 7/1991 | Fujita | 369/44.41 |
| 5,056,080 | 10/1991 | Russell | 369/44.26 |
| 5,099,467 | 3/1992 | Sumihiro et al. | 369/44.26 |

OTHER PUBLICATIONS

Jul. 1, 1978, vol. 17, No. 13, Applied Optics, pp. 2013-2021 "Position Sensing in Video Disk Readout"; J. J. M. Braat et al.

*Primary Examiner*—Donald E. McElheny, Jr.
*Attorney, Agent, or Firm*—Frishauf, Holtz, Goodman & Woodward

[57] ABSTRACT

A laser beam emitted from a laser diode 12 is converted to parallel beams through a collimator lens 14. The beams pass through a stop 15, a polarizing beam splitter 16 and a λ/4 plate 18. The beams are then converged on an optical disc 22 through an objective lens 20 and diffracted by mark set provided on the disc 22. The diffracted beams reflected by the disc 22 enter the objective lens 20, pass through the λ/4 plate 18, are reflected by the polarizing beam splitter 16, and are divided into two parts by a half mirror 24. The reflected part of the beams enters a data reproducing detector 26, and the transmitted part of the beams enters a tracking servo detector 27.

5 Claims, 5 Drawing Sheets

OPTICAL HIGH DENSITY DATA REPRODUCING APPARATUS USING INTERFERENCE TECHNIQUES

BACKGROUND OF THE INVENTION

1. Field of the Invention

The present invention relates to an apparatus for optically reproducing data recorded on a recording medium in the form of marks.

2. Description of the Related Art

With recent development of the information-oriented society, the amount of data to be processed increases more and more, and there is a strong demand for a system capable of recording/reproducing a great deal of data. To meet the demand, various optical data processing systems capable of recording/reproducing data at a high density have been proposed. According to these systems, data is recorded on a recording medium, after it was coded into optically detectable physical marks. These marks are optically detected, thereby reproducing data. The physical marks include recesses (pits), projections, and openings formed on a recording medium. In this case, analog data is recorded in the form of marks having various lengths in the track direction in accordance with the analog data. Digital data is recorded in the form of, for example, a series of marks arranged along the track on the medium. An example of this recording medium is a compact disc which has been widely used. Although the compact disc is most popular in the field of music software, it is also used as a CD-ROM or a computer memory. The capacity of the CD-ROM is 1,000 times or more greater than that of a 5.25" floppy disc which is conventionally used in personal computers.

The above-stated optical data processing system can meet the present demand to some extent; however, there is a demand for a new, improved data processing system capable of recording data at a higher density. To meet the demand, new processing systems have been studied and developed extensively.

SUMMARY OF THE INVENTION

The object of the present invention is to achieve data recording at a higher density.

One possible method of achieving data recording at a higher density comprises the following steps: 1) mark sets each consisting of a plurality of marks are formed along a track of a recording medium, the marks of each set being distanced along the width of the track in accordance with data, thereby to record data on the medium, 2) a coherent beam is radiated on each mark set and is diffracted by the mark set, 3) on the basis of an interference pattern of the diffracted beam, which varies in accordance with the mark distance which is the distance between marks of each mark set, data is reproduced. In the thus obtained interference pattern, the locations of a maximal value and a minimal value depend on the mark distance. For example, the distance between a center maximal value and a 1st-order maximal value decreases, as the mark distance increases. Accordingly, by detecting the distance between the center maximal value and the 1st-order maximal value with use of, e.g. a photodiode, the recorded data coded in the form of pit distance can be read out.

According to the present invention, there is provided an optical data reproducing apparatus comprising: a light source for emitting a light beam; radiating means for radiating the beam from the light source to the mark set; two two-part photodiodes for receiving at least portions of a +1st-order diffracted beam component and a −1st-order diffracted beam component which have been diffracted by the mark set; calculating means for calculating photoelectric conversion outputs from the parts of the two-part photodiodes; and reproducing means for reproducing data from positional data of the 1st-order diffracted beam components shifting in accordance with the mark distance, which positional data is obtained by the calculating means.

DETAILED DESCRIPTION OF THE PREFERRED EMBODIMENTS

Preferred embodiments of the present invention will now be described with reference to the accompanying drawings.

Figure 1:
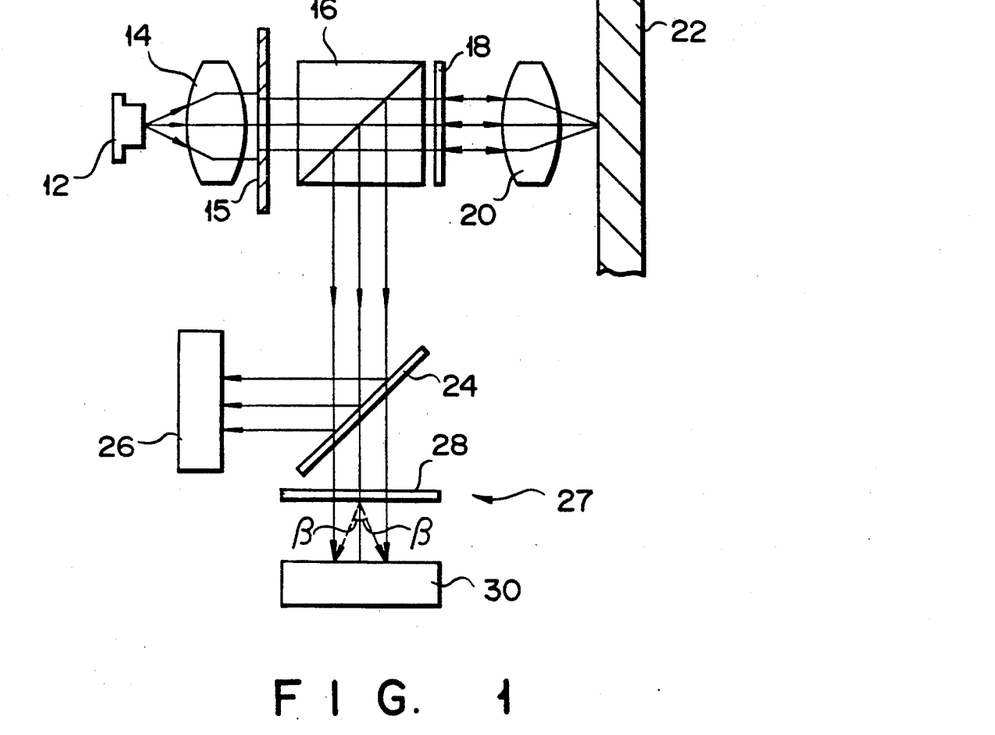
FIG. 1 shows a first embodiment of an optical-type data reproducing apparatus according to the invention.
Figure 2:
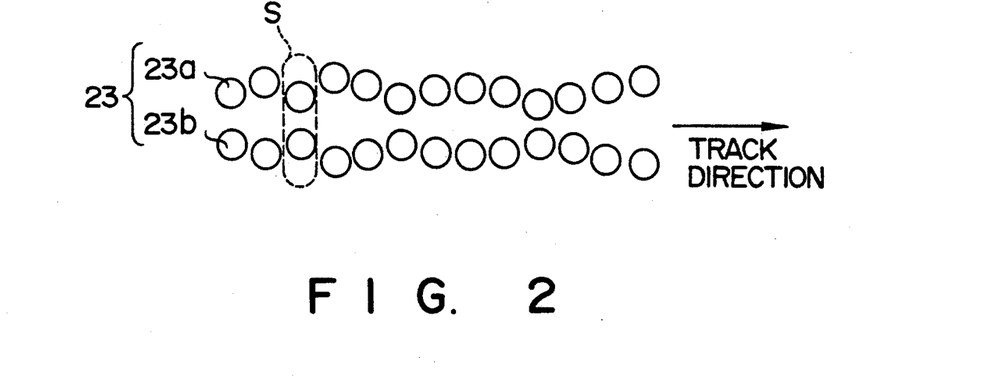
FIG. 2 shows an arrangement of pits provided on an optical disc shown in FIG. 1.
Figure 3:
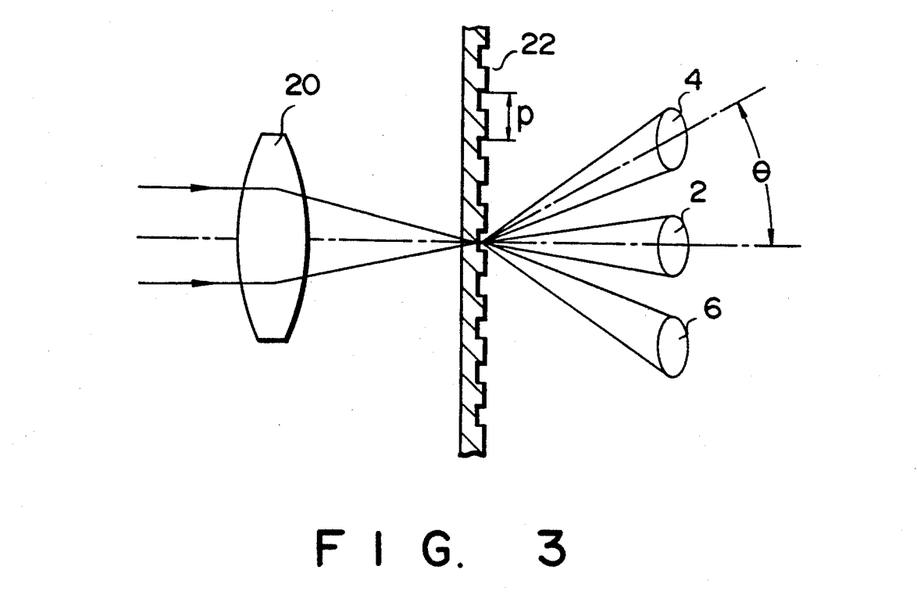
FIG. 3 shows the state of diffraction on an optical disc.

Referring to FIG. 1, a laser beam emitted from a laser diode 12 is converted to a parallel beam by a collimator lens 14. The diameter of the parallel beam is narrowed by a stop 15. The narrowed parallel beam enters an objective lens 20, passing through a polarizing beam splitter 16 and a λ/4 plate 18. The beam is thus converged on the surface of an optical disc 22. As is shown in FIG. 2, the optical disc 22 has a number of mark sets or pit pairs 23 each consisting of two marks or pits 23a and 23b. The pit pairs are arranged in the track direction, and the pits 23a and 23b of each pit pair are distanced along a line substantially perpendicular to the line of the track direction in accordance with the data which is to be represented by the pits 23a and 23b. Each pit pair 23 is illuminated by a beam spot S which is formed on the surface of the optical disc 22. The beam radiated on the pit pair 23 is diffracted at the pair 23 and, as shown in FIG. 3, a +1st-order diffracted beam 4 and a −1st-order diffracted beam 6 are reflected, each with an angle θ to a 0-order diffracted beam 2. In FIG. 3, the incident light is shown on the left side and the reflected light is on the right side, for the purpose of convenience. The diffracted beams 2, 4 and 6 enter the objective lens 20, passes through the λ/4 plate 18, and is reflected by the polarizing beam splitter 16. The three diffracted beams 2, 4 and 6 reflected by the polarizing beam splitter 16 are each halved by a half mirror. The beams reflected by the half mirror 24 enter a data reproducing detector 26, while the beams which have passed through the half mirror 24 enter a tracking servo detector 27.

The reproduction of data recorded on the optical disc 22 will now be described.

When the optical disc 22 is regarded as a diffraction grating, the relationship between incident light and diffracted light is given by $$\sin \alpha - \sin \theta = n \cdot \lambda / p \qquad (1)$$

where $\alpha$ is a light incidence angle, $\theta$ is a diffraction angle, $\lambda$ is a wavelength, p is a cycle of the diffraction grating cycle, and n is an integer representing an order of diffracted light.

As seen from equation (1), as the cycle p of the diffraction grating increases, the diffraction angle $\theta$ becomes smaller. Inversely, as the cycle p decreases, the diffraction angle $\theta$ becomes greater. In other words, the smaller the pit distance, which is the distance between the pits of the pit pair, the greater the distance between the ±1st-order diffracted beams 4 and 6. The greater the pit distance, the smaller the distance between the ±1st-order diffracted beams 4 and 6. Accordingly, the data recorded on the optical disc 22 in accordance with the pit distance can be reproduced by detecting the positions (or amounts of movement) of the ±1st-order diffracted beams 4 and 6.

Figure 4:
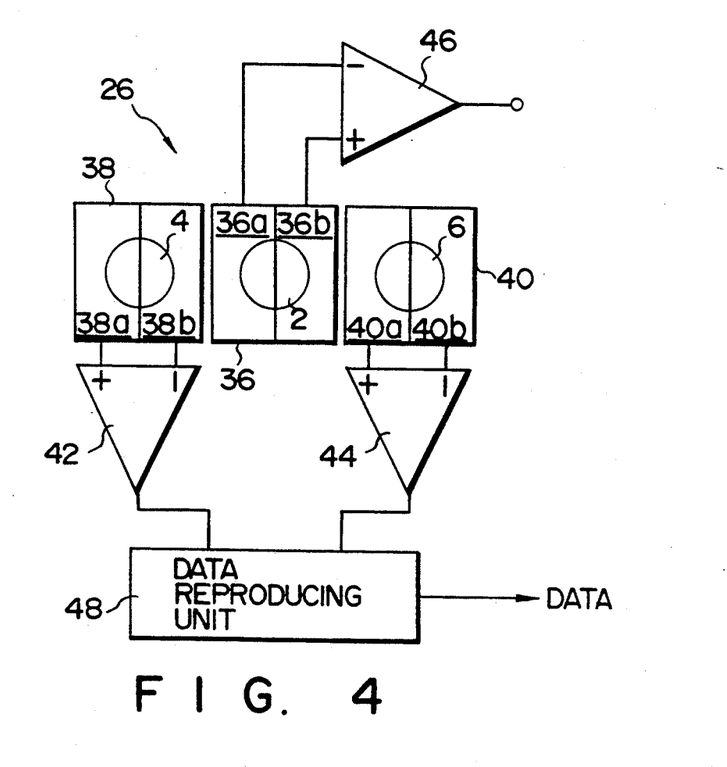
FIG. 4 shows an example of a data reproducing detector shown in FIG. 1.

The positions (or amounts of movement) of the ±1st-order diffracted beams 4 an 6 are detected by the data reproducing detector 26. As is shown in FIG. 4, the detector 26 comprises three juxtaposed two-part photodiodes 36, 38 and 40, comparators 42, 44 and 46 connected to these photodiodes respectively, and a data reproducing unit 48 for reproducing data on the basis of the outputs from the comparators 42 and 44. The diffracted beams 2, 4 and 6 are made incident on the two-part photodiodes 36, 38 and 40. Suppose that the output currents from the two parts 38a and 38b of the photodiode 38 are I (38a) and I (38b) and the output currents from the two parts 40a and 40b of the photodiode 40 are I (40a) and I (40b). When the pit distance decreases and the +1st-order diffracted beams 4 and 6 shift outwards, the relationships of output currents are I (38a)>I (38b) and I (40a)<I (40b). On the other hand, when the pit distance increases and the ±1st-order diffracted beams 4 and 6 shift inwards, the relationships of output currents are I (38a)<I (38b) and I (40a)>I (40b).

Thus, the position (or amount of movement) of the +1st-order diffracted beam 4 is detected as an analog quantity by detecting the difference between I (38a) and I (38b) by use of the comparator 42, and the position (or amount of movement) of the −1st-order diffracted beam 6 is detected as an analog quantity by detecting the difference between I (40a) and I (40b) by use of the comparator 44. The outputs from the comparators 44 and 46 are supplied to the data reproducing unit 48, thereby reproducing the data recorded on the optical disc 22 in accordance with the pit distance along the width of the track. In addition, the data can be reproduced at high speed, since the number of devices for detecting the positions of the ±1st-order diffracted beams is small. In this case, the 0-order diffracted beam component 2 is offset-controlled so that it can always be radiated on the center of the two-part photodiode 36. The offset control is carried out by performing feedback control so that the output of the comparator 46 for outputting the difference in light amount between the parts 36a and 36b can always be zero.

The output from each part of the two-part photodiode contains a noise component more or less. The noise component may be a light-amount variable noise such as laser noise or medium noise, or shot noise of the photodiode. Since the light-amount variable noise is due to a fluctuation of light amount of a light source, the quantity of the light-amount variable noise is proportional to the real light amount at each point of a diffraction pattern and the phase thereof is equal. Accordingly, the light-amount variable noise fluctuates with correlation at each point of the diffraction pattern. On the other hand, the shot noise is random noise and it has no correlation at each point of the diffraction pattern. Where the ratio of the light-amount variable noise voltage to the output is r, actual photoelectric conversion outputs from the parts 38a and 38b of the two-part photodiode 38 are represented by I (38a)+rI (38a), and I (38b)+rI (38b), respectively. The values I (38a) and I (38b) are the output values obtained by removing light-amount variable noise components, and rI (38a) and rI (38b) denote the light-amount variable noise components. Thus, the differential outputs from these parts of the photodiode are given by $$I(38a)+rI(38a)-[I(38b)+rI(38b)]=I(38a)-I(38b)+r[I(38a)-I(38b)] \qquad (2)$$

where $r[I(38a)-I(38b)]$ denotes light-amount variable noise such as laser noise or medium noise. The values I (38a) and I (38b) fall within similar ranges. Each value varies in accordance with the pit distance variation, for example, such that the higher the value I (38a), the lower the value I (38b). When the pit distance is set such that I (38a)−I (38b) is close to zero, the value of light-amount variable noise $r[I(38a)-I(38b)]$ is low. As has been stated above, it is known that most of the noise of the system is the light-amount variable noise. Thus, by removing such correlative noise, the S/N can be substantially enhanced and the recording density can be increased.

Figure 5:
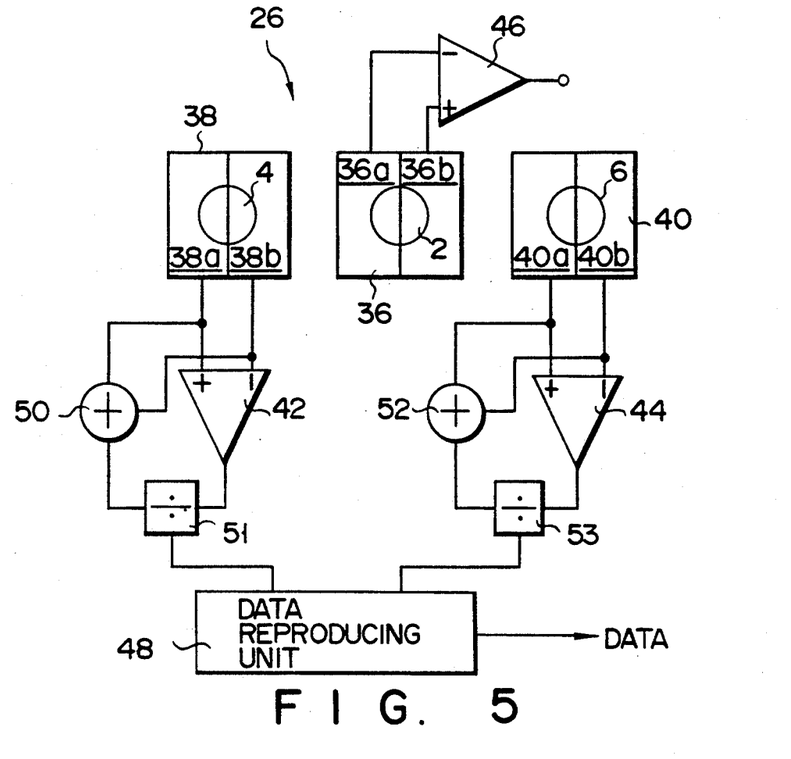
FIG. 5 shows another example of the data reproducing detector shown in FIG. 1.

FIG. 5 shows another example of the detector 26 constituted on the basis of the above principle. Most parts of the structure of the detector shown in FIG. 5 are similar to those of the detector shown in FIG. 4. The difference resides in the manner of finding the positions (or amounts of movement) of the 1st-order diffracted beams. Using a subtracter 42, an adder 50 and a divider 51, the difference between the outputs from the parts 38a and 38b of photodiode 38 is divided by the sum of these outputs. On the other hand, using a subtracter 44, an adder 52 and a divider 53, the difference between the outputs from the parts 40a and 40b of photodiode 40 is divided by the sum of these outputs. On the basis of both divided values, the positions of the 1st-order diffracted beams are found. The outputs from the dividers 51 and 53 are input to the data reproducing unit 48 and the data is reproduced. From the following equation (3), it is understood that the correlative noise component is completely cancelled:

$$\frac{I(38a)+rI(38a)-[I(38b)+rI(38b)]}{I(38a)+rI(38a)+[I(38b)+rI(38b)]}= \qquad (3)$$

-continued
$$\frac{[I(38a) - I(38b)](l + r)}{[I(38a) + I(38b)](l + r)} = \frac{I(38a) + I(38b)}{I(38a) + I(38b)}$$

Accordingly, the noise component is basically only a random noise component, and the S/N is enhanced. Thus, the reproduction resolution can be increased and, as a result, the recording density can be increased.

Figure 6:
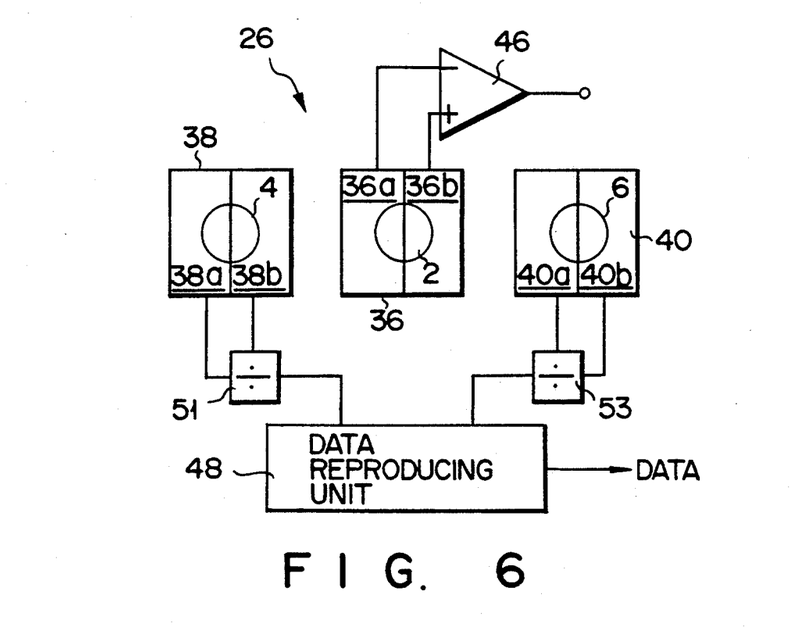
FIG. 6 shows another example of the data reproducing detector shown in FIG. 1.

FIG. 6 shows still another example of the detector 26. In this example, the output from the part 38a of photodiode 38 is divided by the output from the other part 38b (or vice versa) in the divider 51, and the output from the part 40a of photodiode 40 is divided by the output from the other part 40b (or vice versa) in the divider 53. The outputs from the dividers 51 and 53 are input to the data reproducing unit 48 and the data is reproduced. In this case, the divided value is given by $$\frac{I(38a) + rI(38a)}{I(38b) + rI(38b)} = \frac{I(38a)(l + r)}{I(38b)(l + r)} = \frac{I(38a)}{I(38b)} \quad (4)$$

Like in the above example, the correlative noise component is cancelled. Accordingly, since the noise component is basically only a random noise component, the S/N is increased and the reproduction resolution is enhanced. Thus, the recording density can be increased.

Figure 7:
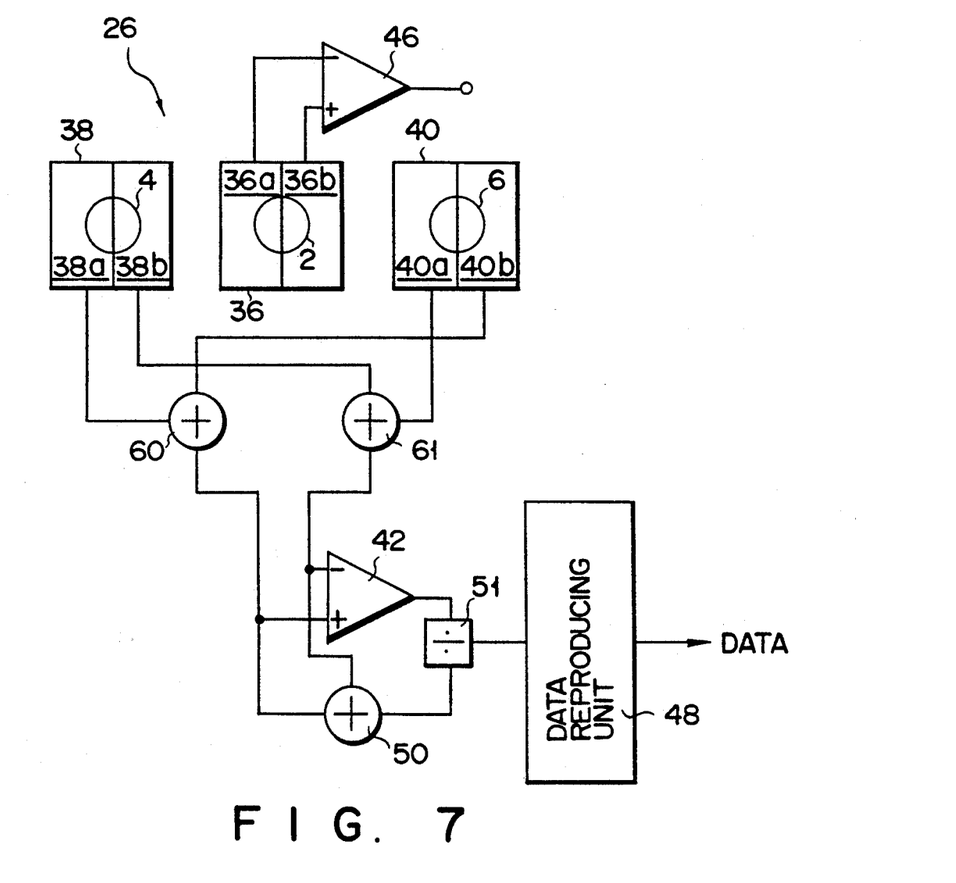
FIG. 7 shows still another example of the data reproducing detector shown in FIG. 1.

FIG. 7 shows still another example of the detector 26. Specifically, an arithmetic operation of $(A-B)/(A+B)$ is performed, where A is an output from an adder 60 which adds the outputs from the part 38a of photodiode 38 and the part 40b of photodiode 40, and B is an output from an adder 61 which adds the outputs from the part 38b of photodiode 38 and the part 40a of photodiode 40. The result of the arithmetic operation is fed to the data reproducing unit 48 and the data is reproduced. By virtue of this structure, the correlative noise can be cancelled, as in the above examples. In addition, an imbalance of ±1st-order diffracted beams due to a tracking error can be reduced. Thus, the influence by the tracking error can be corrected, and correct values can be reproduced.

The tracking servo detector 27 will now be described.

Figure 8:
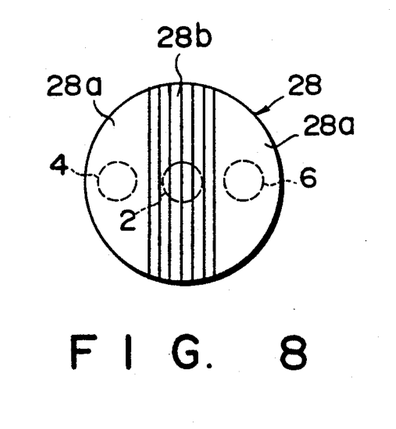
FIG. 8 shows a transmission diffraction grating shown in FIG. 1.
Figure 9:
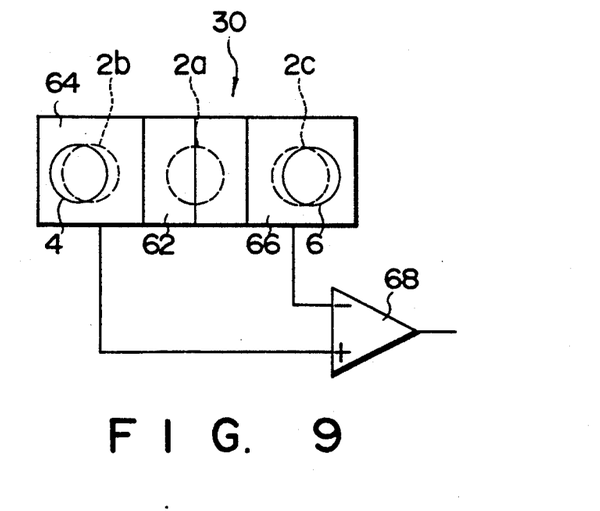
FIG. 9 shows a photodetector shown in FIG. 1.

The detector 27 comprises a transmission diffraction grating 28 and a photodetector 30. As is shown in FIG. 8, the transmission diffraction grating 28 is a disc of transparent quartz. A grating 28b is provided on a center area of the disc, and it extends along a line perpendicular to the optical axis. The photodetector 30 comprises three juxtaposed photodiodes 62, 64 and 66, as shown in FIG. 9. Diffracted beams 2, 4 and 6 which pave passed through the half mirror 24 enter the transmission diffraction grating 28.

The ±1st-order diffracted beams 4 and 6 pass through transmissive parts 28a of the diffraction grating 28 and enter the photodiodes 64 and 66. On the other hand, 0-order diffracted beam 2 enters a grating 28b of the diffraction grating 28 and is diffracted. In the following description, in order to distinguish the diffracted beam diffracted by the pit from that diffracted by the grating, the former is called "pit diffracted beam" and the latter "grating diffracted beam". Each of ±1st-ordergrating diffracted beams 2b an 2c diffracted by the grating 28b by an angle β enters the corresponding photodiode 64, 66. The beams 2b an 2c interfere with the ±1st-order diffracted beams 4 and 6. The outputs from the photodiodes 64 and 66 are supplied to a comparator 68 and a difference therebetween is calculated.

Then, a push-pull signal is obtained and a tracking error signal is detected. In this case, a 0-order grating diffracted beam 2a is offset-controlled by a device (not shown) so that it can always be incident at the center of the photodiode 62.

The method of detecting the push-pull signal will now be described. A phase difference $\phi_\pm$ between the 0-order grating diffracted beam component 2a and the ±1st-order grating diffracted beams 2a and 2c is given by $$\phi_\pm = (2\pi d/\lambda)\sin \theta_\pm = \pm(2\pi d/\lambda)\sin \beta = \pm \phi \quad (5)$$

where d is the grating cycle of the grating 28b.

On the other hand, a phase difference $\Delta\phi_\pm$ is given by $$\Delta\phi_\pm = \Psi_{10} \pm (2\pi/q) v_0 \quad (6)$$

where q is the pit cycle, $\Psi 10$ is the phase difference between the 0-order pit grating diffracted beam and 1st-order pit grating diffracted beam, and $v_0$ is the tracking error.

Light intensities $I_+$ and $I_-$ of the photodiodes 64 and 66 are given by $$I_+ = |A_0 e^{i\phi_+} + A_1 e^{i\Delta\phi_+}|^2 \quad (7)$$

$$I_- = |A_0 e^{i\phi_-} + A_1 e^{i\Delta\phi_-}|^2 \quad (8)$$

where $A_0$ is the amplitude of the 1st-order grating diffracted beam, and $A_1$ is the amplitude of the 1st-order pit grating diffracted beam. In equations (7) and (8), the overlapping of $A_0$ and $A_1$ is considered.

Using the relationship of equations (5) and (6), equations (7) and (8) may be developed, and the difference signal of photodiodes 64 and 66, i.e. the output signal of the comparator 88 is given by $$I_A - I_B = k \sin [\phi + (2\pi/q)v_0 + \pi/2] \quad (9)$$

where k is a proportional constant.

On the other hand, an ordinary push-pull signal is given by $$S_{pp} = k \sin(2\pi/q)v_0 \quad (10)$$

Comparing equations (9) and (10), it is understood that the difference signal according to this method has a phase advanced from that of an ordinary push-pull signal by $\phi + (\pi/2)$. This difference signal may be treated as a signal represented by equation (10), by providing a phase circuit in a tracking servo loop. In this manner, a push-pull signal necessary for tracking servo can be obtained.

Figure 10:
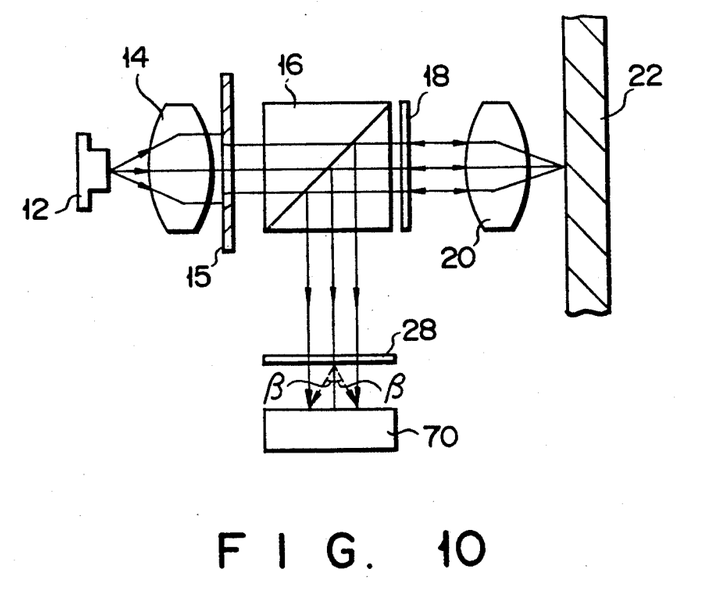
FIG. 10 shows a second embodiment of an optical data reproducing apparatus according to the invention.
Figure 11:
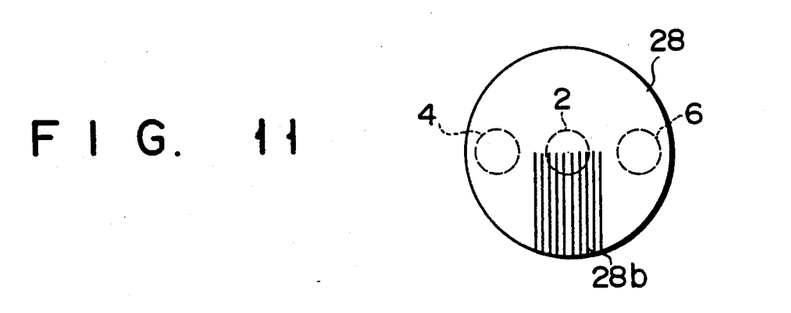
FIG. 11 shows a transmission diffraction grating shown in FIG. 10.
Figure 12:
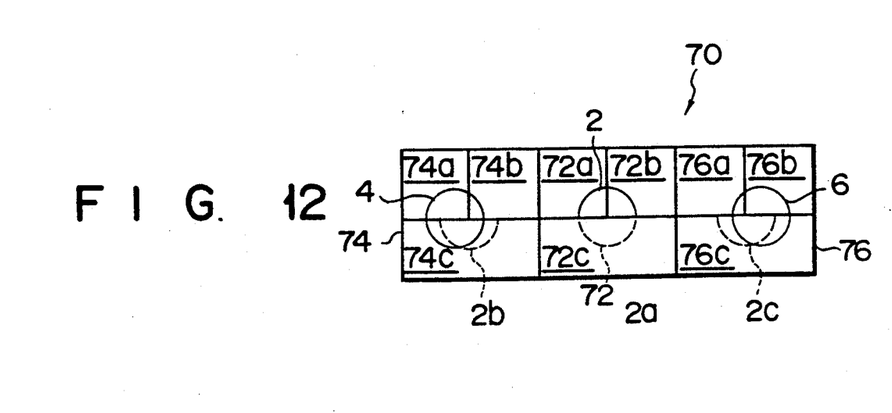
FIG. 12 shows a photodetector shown in FIG. 10.

Referring now to FIGS. 10 to 12, a second embodiment of the optical-type data reproducing apparatus of this invention will be described. In the second embodiment, the same structural elements as in the first embodiment are denoted by like reference numerals and detailed descriptions thereof are omitted.

As is shown in FIG. 10, a laser beam from the laser diode 12 is converted to parallel beams through the collimator lens 14. The beams pass through the stop 15, polarizing beam splitter 16 and λ/4 plate 18, and are converged on the surface of the optical disc 22 by the objective lens 20. The beams are diffracted by the disc 22 into three diffracted beams 2, 4 and 6, as shown in FIG. 3. The diffracted beams 2, 4 and 6 enter the objective lens 20, pass through the λ/4 plate 18, is reflected by the polarizing beam splitter 16, and is made incident on a photodetector 70 through the transmission diffraction grating 28.

The transmission diffractive grating 28 of the second embodiment is a disc of transparent quartz, as shown in FIG. 11. A grating 28b is provided at the lower half of the center area of the disc. Accordingly, the lower half portion of the 0-order bit diffracted beam 2, and the upper half portion thereof passes through the grating 28 and enters the photodetector 70.

As is shown in FIG. 12, the photodetector 70 comprises three photodiodes 72, 74 and 76, and each photodiode has three detection parts. Specifically, each photodiode 72 (74, 76) is divided into an upper part and a lower part 74c, and the upper part is further divided into a left part 74a and a right part 74b.

The ±1st-order pit diffracted beams 4 and 6 pass through the diffraction grating 28 and enter the photodiodes 74 and 76. On the other hand, the upper half of the 0-order pit diffracted beam 2 passes directly through the transmission diffraction grating 28 and enters the upper parts 72a and 72b of the photodiode 72. The lower half of the beam 2 is diffracted by the grating 28b into ±1-st-order grating diffracted beams 2b and 2c each having a diffraction angle β. The beams 2b and 2c enter the lower parts 74c and 76c of photodiodes 74 and 76, respectively, and interfere with the ±1st-order pit diffracted beams 4 and 6.

In the optical data reproducing apparatus of the second embodiment, the upper half of the photodetector 70 corresponds to the data reproducing detector 26 of the first embodiment, and the lower half thereof corresponds to the tracking servo photodetector 30. In the second embodiment, the methods of obtaining data signals and push-pull signals are the same as were used in the first embodiment, and detailed descriptions thereof are omitted.

What is claimed is:

1. An optical data reproducing apparatus for reproducing a quantity of data from a recording medium that stores said quantity of data in the form of mark sets, each mark set including marks formed on a track at intervals corresponding to said quantity of data, said apparatus comprising:
   a light source for emitting a light beam;
   radiating means for radiating said light beam from said light source to at least one of said mark sets;
   two two-part photodiodes for receiving at least portions of a given +1st-order diffracted beam and a given −1st-order diffracted beam that have been diffracted by said at least one of said mark sets;
   calculating means for calculating a plurality of photoelectric conversion outputs from said two parts of said two two-part photodiodes; and
   reproducing means for reproducing said quantity of data from positional data of said given 1st-order diffracted beams that are shifted in accordance with a distance between said marks of said at least one mark set;
   said positional data being provided by said calculating means; and
   said calculating means including a divider for providing a value of a ratio of said photoelectric conversion outputs of said two parts of said at least one of said two two-part photodiodes.

2. The apparatus according to claim 1, wherein said calculating means further includes:
   at least one comparator having input terminals connected to receive output signals from said two parts of a selected one of said two-part photodiodes;
   said at least one comparator producing comparator output signals representative of said output signals from said two parts of said selected one of said two-part photodiodes connected to said input terminals of said at least one comparator;
   an adder for providing an adder output signal by adding an output signal from each of said two-parts of said selected one of said two two-part photodiodes; and
   a divider for obtaining a divided value of said outputs from said comparator and said adder, thereby enabling said calculating means to calculate a value of a ratio of a sum of said plurality of photoelectric conversion outputs of said two parts of said selected one of said two two-part photodiodes to a difference of said plurality of photoelectric conversion outputs, and to output a calculated value.

3. The apparatus according to claim 1, further comprising:
   diffraction means for generating a +1st-order grating diffracted beam and −1st-order grating diffracted beam by diffracting at least a portion of a 0-order diffracted beam from said mark sets; and
   push-pull signal detecting means for detecting a push-pull signal necessary for a tracking servo by causing said +1st-order and said −1st-order grating diffracted beams to interfere with said given +1st-order and said given −1st-order diffracted beams.

4. The apparatus according to claim 3, wherein said push-pull signal detecting means comprises:
   a separating optical device for separating, into two portions, each of said 0-order diffracted beams, said +1st-order diffracted beams and said −1st-order diffracted beam from said mark sets;
   a diffraction grating for diffracting one of said separated two portions of said 0-order diffracted beam into a +1st-order grating diffracted beam and a −1st-order grating diffracted beam;
   a first photodiode, onto which said +1st-order diffracted beams and said +1st-order grating diffracted beam are radiated;
   a second photodiode onto which said −1st-order diffracted beam and said −1st-order grating diffracted beam are radiated; and
   a comparator connected to said first and second photodiodes for outputting a comparator output signal representative of a difference between an output from each of said first and second photodiodes.

5. An optical data reproducing apparatus for reproducing a quantity of data from a recording medium that stores said quantity of data in the form of mark sets, each mark set including marks formed on a track at intervals corresponding to said quantity of data, said apparatus comprising:
   a light source for omitting a light beam;
   radiating means for radiating said light beam from said light source to at least one of said mark sets;
   two two-part photodiodes for receiving at least portions of a given +1st-order diffracted beam and a given −1st-order diffracted beam that have been diffracted by said at least one of said mark sets;
   calculating means for calculating a plurality of photoelectric conversion outputs from said two parts of said two two-part photodiodes; and reproducing means for reproducing said quantity of data from positional data of said given 1st-order diffracted beams that are shifted in accordance with a distance between said marks of said at least one mark set; and wherein said calculating means further includes:

at least one comparator having input terminals connected to receive output signals from said two parts of a selected one of said two-part photodiodes;

said at least one comparator producing comparator output signals representative of said output signals from said two parts of said selected one of said two-part photodiodes connected to said input terminals of said at least one comparator;

an adder for providing an adder output signal by adding an output signal from each of said two-parts of said selected one of said two two-part photodiodes; and a divider for obtaining a divided value of said outputs from said comparator and said adder, thereby enabling said calculating means to calculate a value of a ratio of a sum of said plurality of photoelectric conversion outputs of said two parts of said selected one of said two two-part photodiodes to a difference of said plurality of photoelectric conversion outputs, and to output a calculated value.

* * * * *